May 30, 1950  C. G. PULLIN  2,509,314
HELICOPTER

Filed May 20, 1944  4 Sheets-Sheet 4

Cyril George Pullin
BY
Synnestvedt & Lechner
ATTORNEYS

Patented May 30, 1950

2,509,314

UNITED STATES PATENT OFFICE 2,509,314

HELICOPTER

Cyril George Pullin, Wimbledon, London, England, assignor to The Cierva Autogiro Company, London, England, a British company Application May 20, 1944, Serial No. 536,549
In Great Britain May 18, 1943

7 Claims. (Cl. 170—160.56)

This invention relates to helicopters having one or more torsional flapping rotors with stable characteristic, the last-named terms being defined as under:

"Torsional flapping rotor"=a lifting or/and sustaining rotor whose blades are independently pivoted to the hub for "flapping" in planes containing the blade axis and the rotational axis and in such a way (either by obliquity of the flapping pivot or by a system of compound pivots and suitable constraints) that the blade pitch angle varies with and is uniquely dependent on the flapping angle;

"Stable characteristic"=a torsional flapping rotor has a "stable characteristic" if the pitch angle decreases with upward flapping.

This invention is particularly concerned with the blade mounting articulations of a helicopter with a torsional flapping rotor of stable characteristic.

I have found that advantages are to be gained, especially in lightness of and response to the controls, by using a higher ratio of pitch change amplitude to flapping angle than hitherto has been usual, but this introduces additional problems.

Performance considerations in a helicopter require in general a rotor of low "solidity." This means that the rotor blades are of narrow chord relative to their tip radius and consequently the torsional stiffness of the blades is not high. If therefore a "torsional-flapping" blade-mounting articulation is situated at the root of the blade its operation may be seriously affected by elastic twist of the blades and any tendency towards instability of the torsional-flapping oscillation or towards resonance with a natural elastic frequency of the blade may have serious consequences. On the other hand, aerodynamic forces affecting and affected by the pitch angle of the blade are large towards the tip and small towards the root of the blade and at a right approximation may be considered as confined to the outer half of the blade. For this reason, especially if the ratio of torsional to flapping displacement is high, i. e. more than unity, it is sufficient for the torsional component of the displacement to be confined to the outer part of the blade. Owing, however, to the effect of gyroscopic forces it is desirable for the flapping component to affect the whole blade, for if a flapping pivot (or an oblique pivot giving combined torsional-flapping displacement) has a large offset from the axis of rotation the gyroscopic reactions of the hub and blade parts inboard of the pivot will make the controls unduly heavy and introduce precessional effects which will disharmonise the controls.

An object of the invention, therefore, is to meet the above requirements.

This object is achieved by this invention by constructing a rotor blade in two parts, an inboard and an outboard, which are connected by torsional-flapping pivot means (of stable characteristic), the inboard part being connected to the hub or an intermediate blade mounting member by a flapping pivot.

The torsional-flapping characteristic of the pivot means on which the outboard part of the blade is articulated may be obtained by the use of a single pivot, whose axis is inclined outwardly and forwardly (with reference to the direction of rotation of the rotor) in relation to the radial axis of the blade.

Alternatively, the outboard blade part may be articulated to the inboard part on a purely torsional pivot (substantially coaxial with the radial blade axis), the torsional flapping characteristic being obtained by providing a mechanical connection or linkage between the outboard blade part and the blade mounting member or hub, which ensures the required relationship between pitch change (of the outer blade part) and flapping displacement (of the whole blade).

The proportions of the two blade parts are a matter for selection in each individual design, but, usually, the radial length of the inboard part will be not less than a third of the tip radius. The flapping pivot is preferably situated as near the axis of rotation as practical considerations will admit.

In the second alternative construction, any convenient mechanical connection may be used for obtaining the required relation between pitch change and flapping, e. g. the bevel pinion and sector. Owing however to the outboard position of the torsional pivot, such a mechanism will not usually be convenient and a lever fast on the outboard blade portion and engaging an arm fast on a non-flapping part of the blade mounting will usually be preferred.

Further, the arm referred to above may be rotatable about the flapping pivot axis and geared, e. g. by an epicyclic gear, to the inboard blade portion so as to flap in phase with the blade, but with reduced amplitude, the object of this arrangement being to avoid the use of a cumbrously long lever on the outboard blade portion in order to obtain the desired ratio of pitch change to flapping. This arrangement provides also a convenient means of varying the pitch change/flapping ratio on the ground by changing the elements of the reduction gear actuating the arm, so as to obtain a different gear ratio. To facilitate this, complete gear trains giving different ratios may be made available, being assembled in interchangeable housings with quickly detachable mountings.

In its simplest form the second alternative construction embodies a pure flapping pivot at the inboard end of the blade and a pure torsional pivot at the root of the outboard portion, but the axes of either or both these pivots may be slightly oblique when projected on a plane perpendicular to the rotational axis, so that on the one hand flapping of the inboard part may be accompanied by a small amount of pitch change and on the other the torsional displacement of the outboard portion may be accompanied by slight flapping relatively to the inboard part and this additional flapping may be either of the same sign as the main flapping or of sign opposite thereto. Furthermore, it is not essential that either the torsional or the flapping pivot axis lie in a plane perpendicular to the axis of rotation.

How the foregoing objects are attained, and others which will hereinafter appear, will be understood from the following description with reference to the accompanying drawings of two typical embodiments of the invention, the scope of which is defined in the appended claims.

In the drawings:

Figure 4 is a view of a detail of Figures 2 and 3, taken along the line 4—4 of Figure 2;

Figure 1:
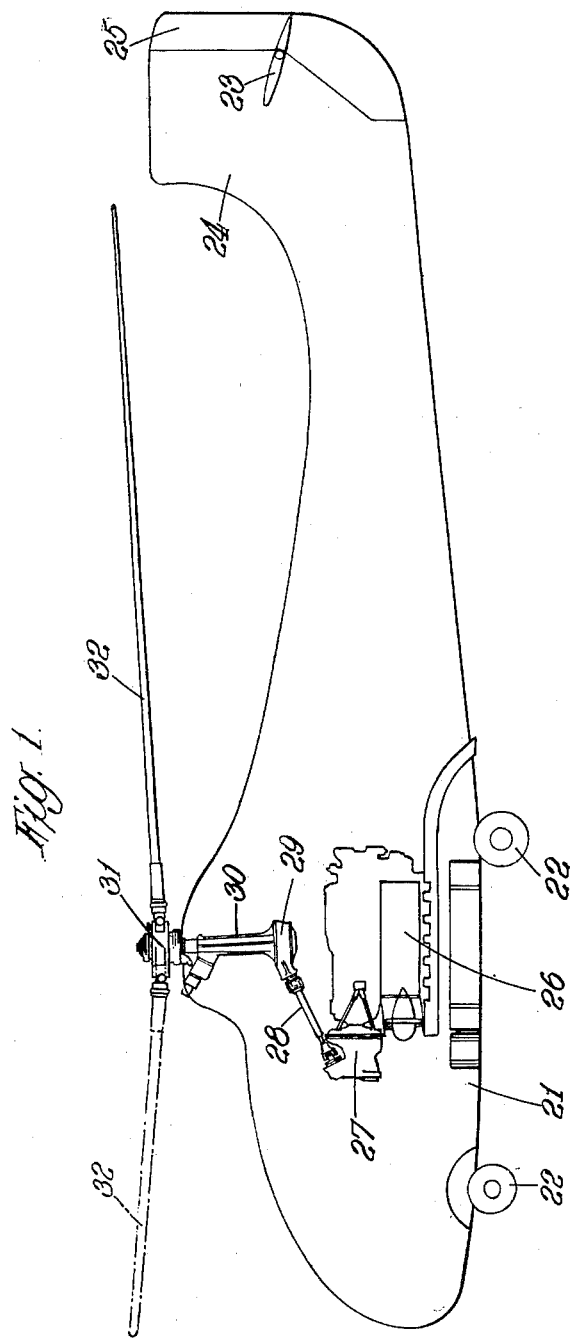
Figure 1 is a general arrangement view in side elevation, partly sectioned, of a helicopter embodying the present invention.

Referring to Figure 1, the helicopter includes a body 21, undercarriage elements 22, elevator 23, vertical fin 24 and rudder 25. Within the body is mounted the engine 26, which drives the rotor through gears contained in gear boxes 27, 29 and a transmission shaft 28. The final drive shaft is contained in a casing 30 forming an extension of the gear box 29.

The rotor hub is shown at 31 and the lifting rotor blades at 32.

Figure 2:
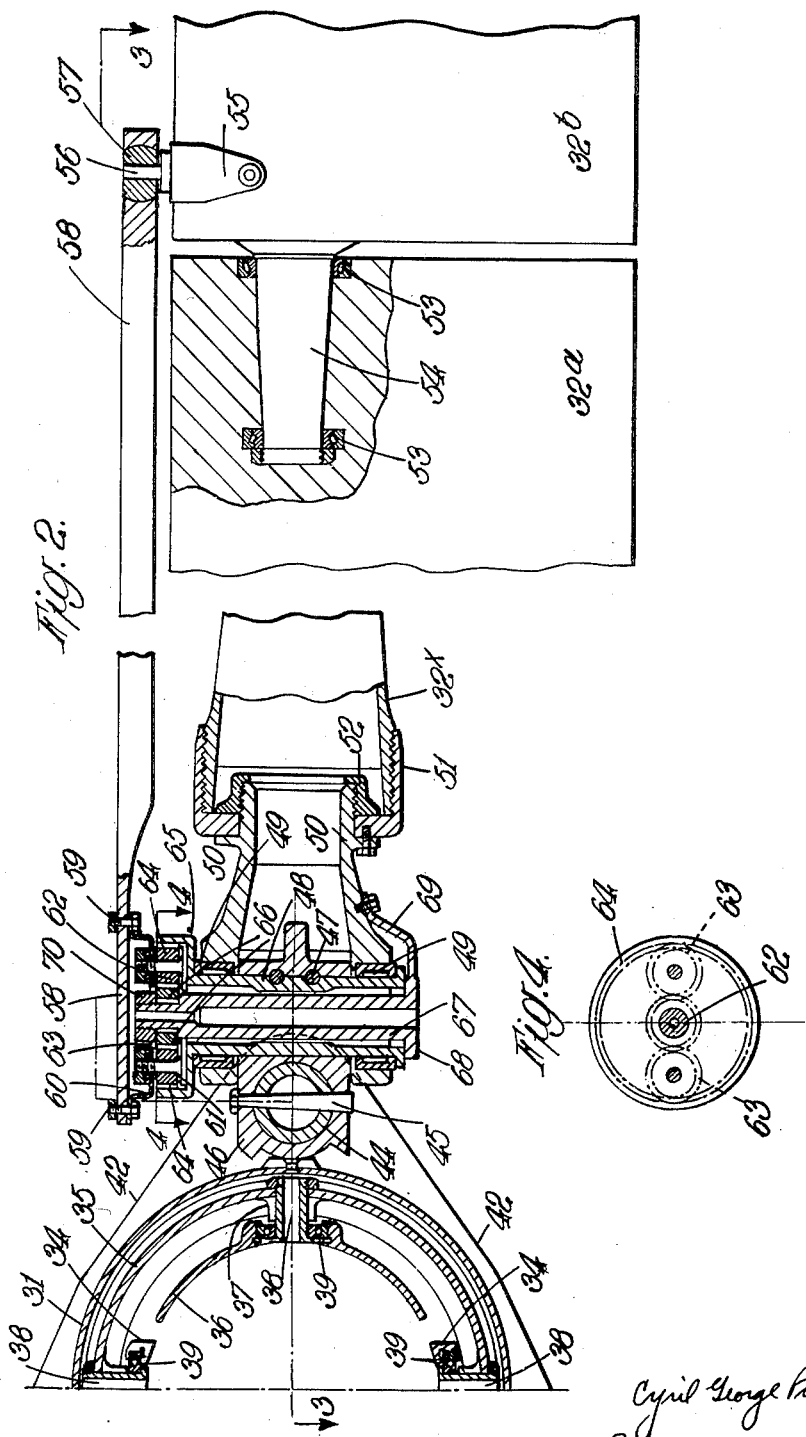
Figure 2 is a view in plan section of the rotor hub and one blade of the helicopter of Figure 1.
Figure 3:
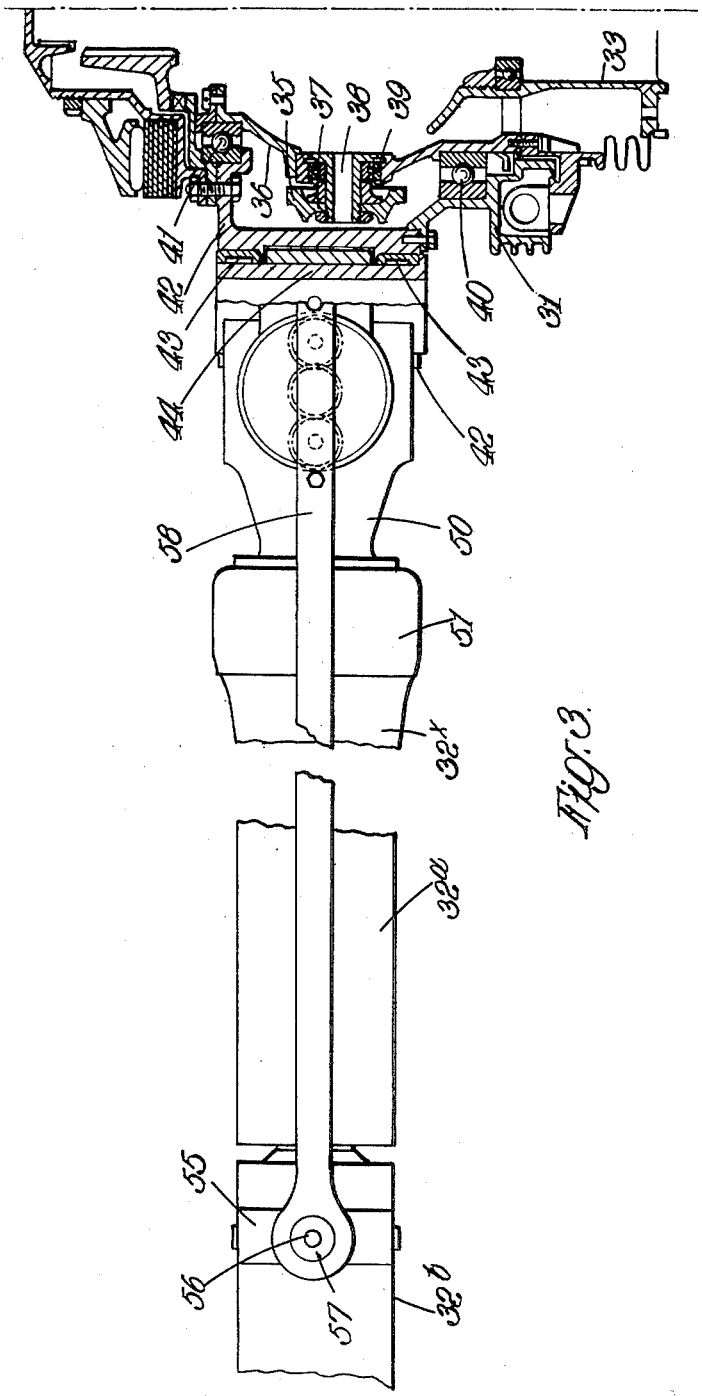
Figure 3 is a view in elevation taken along the line 3—3 of Figure 2.

Referring now to Figures 2 to 4, the casing 30 is extended upwardly by a supporting member 33 terminating upwardly in a fork end 34 which supports a gimbal ring 35; this in turn supports a (non-rotative) axle member 36. The gimbal ring has four inwardly projecting bosses 37 carrying trunnions 38, pairs of which articulate respectively with the fork ends 34 and the axle member 36 by means of bearings 39.

The axle member 36 rotatably supports the hub 31 on bearings 40, 41.

The hub 31 is provided with paired ears 42, each pair of which carries bearings 43 supporting a drag pivot pin 44 to which is secured by taper pins 45 a drag link 46. In the latter is secured by taper pins 47 a hollow flapping pivot pin 48, on which a forked blade root stub 50 is rotatably mounted by means of bearings 49.

The inboard part 32a of the blade 32 terminates inwardly in a tubular element 32x secured to the stub member 50 by means of a threaded collar 51 and cap nut 52.

The outer end of the inboard portion 32a of the blade carries "torsional" bearings 53 in which a stub axle 54 secured to the outboard part 32b of the blade is rotatably mounted.

Thus the drag articulation 42 to 46 allows the blade to "lead and lag" from the mean radial position; similarly, the flapping articulation 48, 49, 50 allows the whole blade to flap and the torsional articulation 53, 54 allows the outboard blade portion 32b to vary its pitch angle.

The latter mode of motion is interconnected with the flapping by means of a bracket 55 fixed to the outboard blade portion 32b and terminating in a forwardly projecting spigot 56 carrying a spherical bead 57 engaging a spherical seating formed in the end of an arm 58, whose inboard end is secured by bolts 59 to the outer, 60, of a pair of plates 60, 61 constituting the planetary cage of an epicyclic train, consisting of a sun wheel 62, planets 63 and annulus 64. The latter is formed in an extension 65 of the flapping pivot pin 48.

The sun wheel is internally splined to engage splines 66 on the end of an internal pin 67 mounted within the hollow flapping pivot pin 48 and having its head 68 anchored to the blade root stub 50 by means of a bracket 69.

The epicyclic gearing 60, 61, 62, 63 is a detachable unit being removable by loosening the sun wheel retaining nut 70 and the bolts 59.

The epicyclic gearing causes the arm 58 to move about the axis of the flapping pivot in phase with the flapping of the blade, but with reduced amplitude; and the connection of the end of the arm with the spigot 56 causes the outboard blade part 32b to vary its pitch angle in phase with the flapping of the whole blade, in the stable sense, i. e. upward flapping accompanied by decrease of pitch angle. The ratio pitch change/flapping depends on the ratio of the distances of the centre of the bead 57 from the flapping pivot and torsional pivot axes respectively and also on the ratio of flapping amplitudes of the blade stub 50 and arm 58, which depends on the tooth ratio of the sun wheel 62 and planets 63 of the epicyclic gearing.

A selection of ratios for the latter can be made available by providing a number of interchangeable gear units 60, 61, 62, 63, having different tooth ratios.

Figure 5:
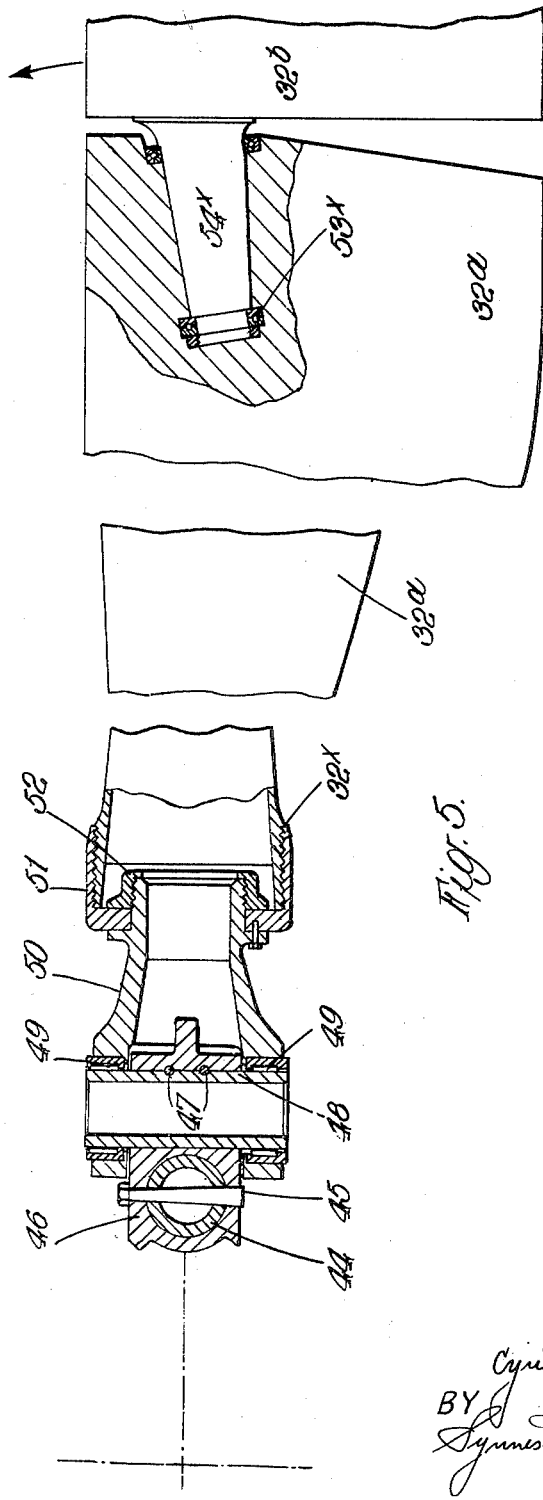
Figure 5 is a view similar to Figure 2 showing an alternative embodiment of the invention.

In the alternative construction illustrated in Figure 5 the outboard blade part 32b is articulated to the inboard part 32a by means of a simple torsional flapping pivot 53x, 54x having its axis inclined forwardly and outwardly with respect to the direction of rotation of the rotor, indicated by an arrow.

Motion of the outboard blade part 32b, relatively to the inboard part 32a on the pivot 53x, 54x, is independent of the flapping of the inboard part, which takes place about a flapping articulation 48, 49, 50, of similar construction to that shown in Figures 2 and 3, the constraint 56, 57, 58 etc., being omitted.

Other parts indicated by reference numbers in Figure 5 correspond in structure and function to parts having the same reference numbers in Figures 2 and 3.

In both forms of construction, as illustrated, control of the rotor in flight is obtained by tilting the axle and hub about its gimbal mounting. The control linkages from the axle to the pilot's controls are not shown or described as they are not part of this invention and their construction is within the competence of those skilled in the art.

For the same reason the transmission means whereby the drive is imparted to the rotor hub are also not described or illustrated.

What I claim is:

1. In a helicopter including a rotor hub, a rotor blade having two aerofoil parts, outboard and inboard, respectively; inboard mounting means connecting the inboard blade part to the hub and including pivot means providing an axis for lag-lead movements of the blade and an axis outboard of said lag-lead axis for flapping movements of the blade; connecting means between the outboard and inboard blade parts providing for pitch-changing movement of the outboard part; and a control arm connected at one end to the outboard blade part and at its other end to the inboard mounting means, whereby to restrain the amplitude of pitch-varying movements of the outboard blade part.

2. The construction of claim 1, in which the control arm is connected to the inboard mounting means on a rotational axis substantially coincident with the flapping axis.

3. In a helicopter including a rotor hub, a rotor blade having two aerofoil parts, namely, an inboard and an outboard part, pivotal means connecting the inboard blade part to the hub and having a generally horizontal axis substantially perpendicular to the blade axis, and restraining said part as against pitch change, and articular mounting means for the outboard part including a unitary pivot pin interconnecting adjacent ends of the inboard and outboard blade parts and having its axis substantially parallel to the blade axis so as to constrain the outboard part to partake of flapping movements of the inboard part, and linkage coupled to the rotor hub and to said outboard part in position to constrain the outboard part to change pitch relative to the inboard part in a sense to reduce the pitch thereof with upward flapping.

4. The mechanism of claim 3, in which the constraining linkage comprises an arm connected to the outboard blade part at one end and at the other end to the rotor hub through said pivotal means.

5. A helicopter construction as claimed in claim 3, with a drag pivot, operative independently of the other mentioned pivotal and articular means, permitting displacement of the whole blade relatively to the hub substantially in the leading and lagging directions.

6. In a helicopter rotor, a controllably tiltable rotor hub, a rotor blade constructed in two aerofoil parts, outboard and inboard respectively, a substantially flapping pivot connecting the inboard blade part to the hub, a substantially torsional or pitch-varying pivot interconnecting the outboard and the inboard blade parts, and linkage which relates the relative torsional displacement of the two blade parts on said last-named pivot and the flapping of the whole blade on said first-named pivot, in the sense that decrease of pitch angle of the outboard blade part is accompanied by upward flapping and vice versa, whereby undesirable loads on the rotor tilting system are minimized, said linkage comprising a lever fast on the outboard blade part and an arm disposed substantially parallel to the blade having its outboard end universally jointed to said lever and its inboard end connected with the hub, said connection with the hub being by a pivotal mounting for displacement about the axis of the flapping pivot first mentioned, said inboard pivotal mounting for said arm incorporating gearing means causing the arm to flap in phase with the inboard blade part but with diminished amplitude.

7. A construction as claimed in claim 6 wherein the gearing comprises an epicyclic train constructed as a detachable component replaceable by similar components giving different gear ratios, for varying the ratio between the flapping amplitudes of the arm and inboard blade part.

CYRIL GEORGE PULLIN.

REFERENCES CITED

The following references are of record in the file of this patent:

UNITED STATES PATENTS

| Number | Name | Date |
| --- | --- | --- |
| 22,595 | Upson | Jan. 23, 1945 |
| 1,884,847 | Pitcairn | Oct. 25, 1932 |
| 1,948,457 | Larsen | Feb. 10, 1934 |
| 1,986,709 | Breguet | Jan. 1, 1935 |
| 2,108,839 | Wilford | Feb. 22, 1938 |
| 2,284,717 | Bennett | June 2, 1942 |
| 2,318,259 | Sikorsky | May 4, 1943 |
| 2,330,842 | Pullin | Oct. 5, 1943 |
| 2,380,582 | Cierva | July 31, 1945 |

FOREIGN PATENTS

| Number | Country | Date |
| --- | --- | --- |
| 212,105 | Switzerland | Feb. 17, 1941 |

Certificate of Correction

Patent No. 2,509,314                                            May 30, 1950

CYRIL GEORGE PULLIN

It is hereby certified that errors appear in the printed specification of the above numbered patent requiring correction as follows:

Column 1, line 43, for the word "right" read *rough*; column 6, line 41, list of references cited, under the heading "UNITED STATES PATENTS", for "22,595" read *Re. 22,595*; after line 45, insert the following:

*2,162,794*      Asboth _____ *June 20, 1939* and that the said Letters Patent should be read with these corrections therein that the same may conform to the record of the case in the Patent Office.

Signed and sealed this 5th day of September, A. D. 1950.

[SEAL]

THOMAS F. MURPHY,
                                                                 *Assistant Commissioner of Patents.*